May 2, 1967
H. C. FISCHER
3,316,881
ARTIFICIAL OYSTER CULTCH
Filed Dec. 13, 1965
2 Sheets-Sheet 1
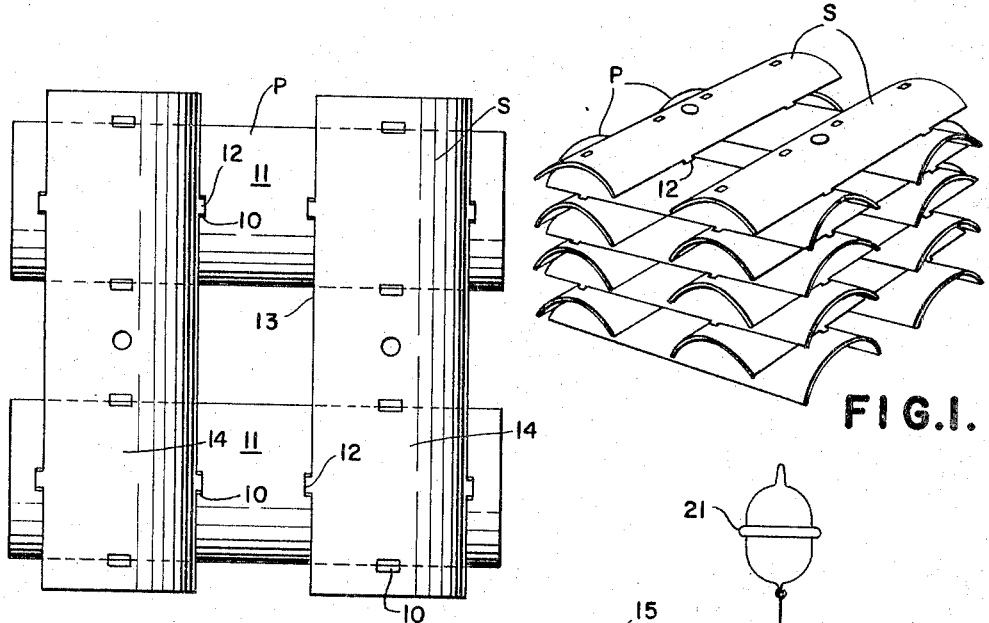
FIG.1.
FIG.3.
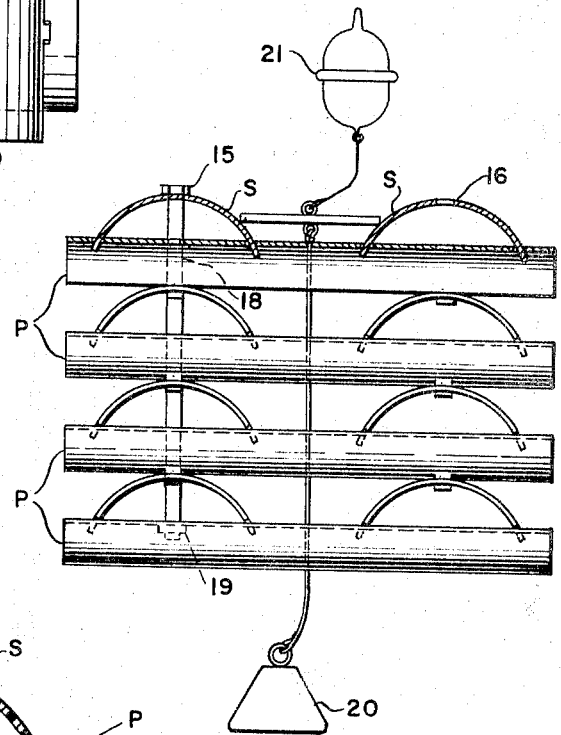
FIG.2.
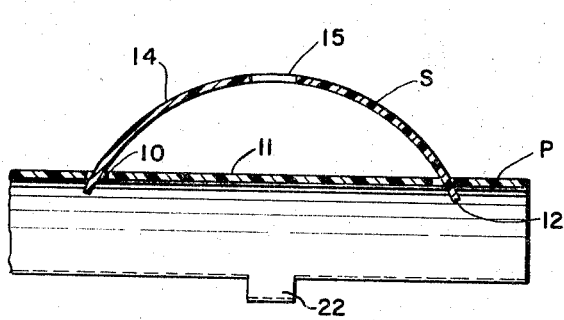
FIG.4.
INVENTOR
Harry C. Fischer
BY *Birch and Birch*
ATTORNEYS

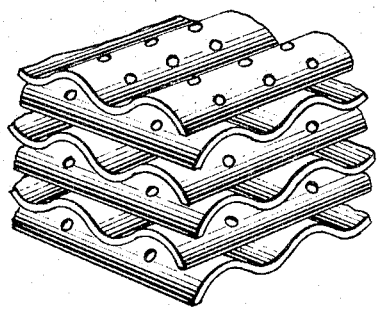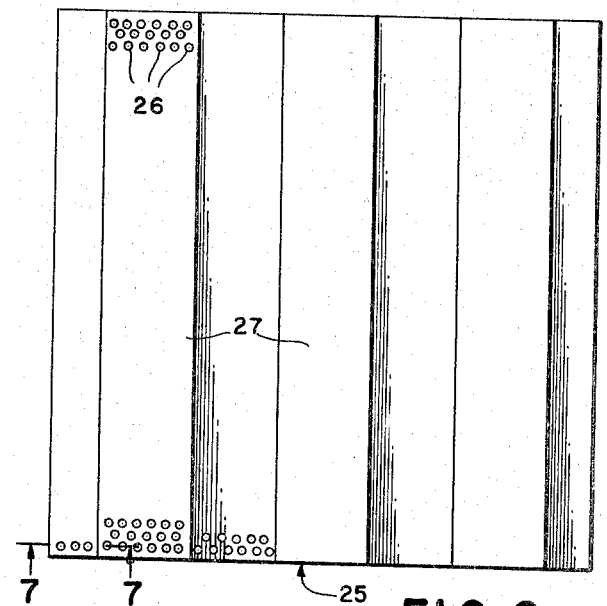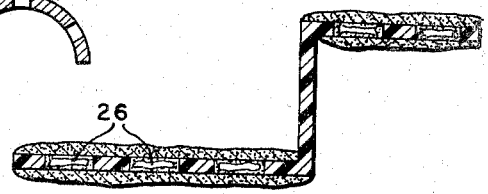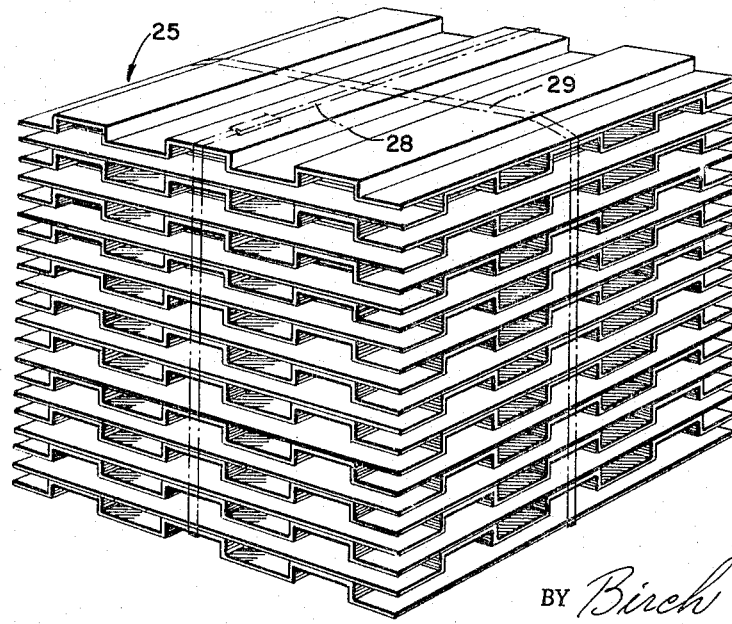
INVENTOR
Harry C. Fischer
BY *Birch and Birch*
ATTORNEYS

United States Patent Office 3,316,881
Patented May 2, 1967

3,316,881
ARTIFICIAL OYSTER CULTCH
Harry C. Fischer, Box 548, Goose Neck Road,
Royal Oak, Md. 21662
Filed Dec. 13, 1965, Ser. No. 513,224
14 Claims. (Cl. 119—4)

The present invention relates to collecting and setting spat and particularly to artificial oyster cultch materials and arrangements thereof.

An important part of oyster farming is the provision of efficient cultch means for collecting and setting oyster spat. Heretofore, numerous varieties of solid materials usually lime coated known to the art as "cultch," to which the spat will attach themselves have been used and it is an object of this invention to provide novel artificial cultch material suitably coated or uncoated for collecting and promoting the set of shell-fish spat thereon.

Another object is to provide a novel artificial cultch arrangement of horizontal surfaces spaced and superimposed in spat collecting positions, until the spat is large enough to be selectively picked or removed from the cultch for transplanting in oyster culture trays or the like.

Another object is to provide a novel stacked arrangement of superimposed layers of cultch surfaces with novel connecting and assembly means, whereby the cultch may be positioned in predetermined predator protected buoy marked locations in natural oyster feeding water.

A more specific object is to provide artificial oyster cultch from plastic foamed sheets, such as sheets of polyethylene and the like.

With the foregoing and other objects in view, the invention consists in the construction, arrangement and combination of parts hereinafter described and particularly defined in the appended claims, it being expressly understood that there is no intent to limit this invention to the details of construction illustrated.

In the drawings like parts throughout the several views are given like numerals and are thus identified in the following description, wherein:

FIGURE 1 is a perspective view of an assembled array of oyster cultch means according to one embodiment of this invention;

FIGURE 2 is an end view partly in section and partly in elevation of the assembled cultch array of FIGURE 1;

FIGURE 3 is a top plan view of the same;

FIGURE 4 is a cross section view of a top cultch member and a lower adjacent supporting member with a locking tab for the next lower cultch layer;

FIGURE 5 is a perspective view of a second embodiment of the invention showing an arrangement for stacking spat seeded cultch means;

FIGURE 6 is a top plan view of one cultch sheet showing it formed with a series of perforations;

FIGURE 7 is a partial section taken of one cultch sheet with a coating of lime material or the like thereon, which coating partly extrudes into the perforations in the cultch sheets;

FIGURE 8 is a partial section view of a modification of the cultch sheet of FIGURE 5, where the same is made with sinuous or smooth corrugations; and FIGURE 9 is a perspective view of a stack of cultch sheets of the smooth corrugated type shown in FIGURE 8.

Referring in detail to the drawings and first with particular reference to FIGURES 1 and 2, the assembled cultch arrangement comprises a plurality of primary support or base members generally designated P and a plurality of secondary transverse cross members S.

The primary members P are elongated fabrications of any suitable material and are formed with spaced slots 10 in the respective top surfaces 11 thereof, see FIGURES 3 and 4. These slots are so shaped and positioned on the respective top surfaces 11 as to each receive tongues or connecting lugs 12 formed from the respective longitudinal edge portions 13 of each of the secondary cross members S. When the respective lugs 12 of each adjacent superimposed secondary cross member S are inserted in a mating slot 10 the respective adjacent primary and secondary members become secured together, so that the secondary members present horizontal spat collecting surfaces 14.

In referring to FIGURE 4, it is clear that the slots 10 are arranged and spaced in the primary members P so that when the lugs of the secondary members S are engaged in the primary member slots, they become slightly bowed or exteriorly convex, to thereby present the convex elongated spat collecting surface as generally designated 14.

Any suitable artificial cultch material may be used which is adapted to be sufficiently pliable to permit the same to be bent into positions for interlocking the lugs 12 of the secondary members with the primary members. One material that has been discovered as most efficient in use is a foamed synthetic plastic, such as polyethylene foam form molded into plastic sheets. These sheets are sufficiently flexible for the use intended and may be cut in elongated rectangular formations with the locking lugs 12 integral therewith. Such plastic material makes very efficient cultch as the spat will attach to this material without a coating substance, such as lime or if desired it may be lime coated or laminated to a film of more suitable material such as polyvinylfluoride, generally known as "Tedlar." However, when not coated, the inherent qualities of the plastic foamed sheet plus its inherent flexible qualities permit the spat to be very readily removed by the oyster culture farmer for transfer without harming the soft shelled spat to culture trays for final stages of oyster culture.

Each cultch layer may include, for example, two or more primary and secondary members and may be compiled in as many layers as desired in vertically spaced apart relation, see FIGURE 2. Also, each secondary member S and each primary member P is preferably formed with openings 15 and 16, respectively. These openings of the members are positioned in alignment with respect to each other so that a tie bolt 18 and washer means 19 may be inserted through the respectively aligned openings to hold the cultch array together. However, the interlocking tabs are generally sufficient to hold and retain the cultch array together without the need of such bolt and washer means.

The completely assembled cultch array may be anchored below the surface of the water on the bottom of the bay by an anchor 20 and the position thereof marked by a suitable buoy or float 21, see FIGURE 2.

In addition to the lock tabs or lugs 12 of the secondary member S, the primary member P may be formed with depending side lugs 22 adapted to engage with mating slots formed in the next adjacent lower secondary member S. Thus the members S and P are crisscrossed alternately with respect to each other and interlocked by their respective lugs and mating slots to form an artificial cultch array.

FIGURES 5, 6 and 7 disclose a second embodiment of the present invention. This embodiment is comprised of suitable corrugated or fluted sheets 25 which may be solid plastic or foamed plastic or the like formed smooth or with coating adhering perforations 26.

The several raised flutes or corrugations 27 of each respective sheet are positioned in crossed relation in the manner of the separable raised secondary members S of the first embodiment. Each upper surface of each sheet is preferably in a horizontal position to serve as a collector for the swimming spat to set upon. With the lime formulation coated upon the sheets, the cultch enhances the set or spat development and the formulation may be treated to repel predators, thereby affording protection to the spat on the seeded cultch, while the same is below the surface of natural oyster growing water.

The oyster cultch sheets may be stacked as shown in FIGURE 5 and secured together by any suitable means, such as detachable strap means 28 and 29 or each corner of each sheet may be formed with an opening, not shown, and aligned to receive a rod or the like, also not shown, whereby the seed cultch sheets are held in stacked relation.

Also, the seeded cultch of embodiment two may have similar anchor means and a position indicating float as shown in connection with FIGURE 2 of embodiment one.

As shown in FIGURE 8, a third embodiment of cultch sheet may be made with sinuous or smooth corrugations 30 and placed in a cultch stack, see FIGURE 9, until the spat have been caught. After the spat have been caught the sheets may be separated. These cultch sheets may be held together by any temporary strap means or the like in the same manner as shown in FIGURE 5.

Thus there is provided novel artificial cultch to seed oyster spat, said cultch being inherently attractive to the spat with or without spat attracting coatings and being adaptable to positioning in natural oyster feeding water in stacked and unstacked relation.

Without further description it is believed that the advantages of the present invention over the prior art is apparent and while only three embodiments of the same are illustrated, it is to be expressly understood that the invention is not limited thereto as various changes may be made in the combination and arrangement of the parts illustrated, as will now likely appear to others and those skilled in the art. For a definition of the scope or limits of the invention, reference should be had to the appended claims.

What is claimed is:
1. Artificial cultch comprising vertically spaced superimposed sheets, said sheets suitable to set spat and having raised central portions and lower edge portions and comprising alternately positioned crisscrossed members, and connecting means for holding said sheets together in crisscrossed stacked relation.

2. Artificial cultch described in claim 1, wherein said members are formed of foamed plastic.

3. Artificial cultch described in claim 1, wherein said members are formed of polyethylene foamed plastic.

4. Artificial cultch described in claim 1, wherein said sheets include primary support sheets and secondary spat collecting sheets, said secondary sheets having lugs adapted to interlock with said primary support sheets.

5. Artificial cultch described in claim 1, wherein said members are formed of foamed plastic, said foamed plastic being lime coated.

6. Artificial cultch described in claim 1, wherein said members are formed of foamed plastic having a thin film of plastic laminated thereto.

7. Artificial cultch comprising sheet material suitable to set spat, said sheets having alternately raised portions and connecting means for stacking said cultch sheets with the raised portions in crisscrossed relation.

8. Artificial cultch described in claim 7, wherein each sheet is formed with perforations and a spat collecting coating on said sheets extruding at least partially into said perforations.

9. Artificial cultch described in claim 7, wherein each sheet is formed of foamed plastic.

10. Artificial cultch described in claim 7, wherein said cultch sheets are formed with aligned openings to receive said connecting means.

11. Artificial cultch described in claim 7, wherein said sheets are so shaped and proportioned as to be vertically spaced apart to provide spat collecting areas when connected in stacked relation by said connecting means.

12. Artificial cultch described in claim 7, wherein said sheet material includes raised elongated surfaces for collecting spat when said surfaces are horizontally positioned.

13. Artificial cultch described in claim 7, said cultch sheets connecting means being separable, whereby said cultch after the spat has been caught may be separated and placed at separate locations.

14. Artificial cultch as described in claim 7, wherein said sheets are formed with sinuous smooth corrugations, said sheets being in a stack with each corrugation thereof transverse each contiguous sheet in the stack.

References Cited by the Examiner

UNITED STATES PATENTS 3,294,061  12/1966  Hanks _____ 119—4

FOREIGN PATENTS 1,278,113  10/1961  France.

OTHER REFERENCES

A New Chapter in Shellfish Culture by William Firth Wells, Conservation Commission, State of New York, reprinted from 15th Annual Report, 1925, J. B. Lyon Company, Albany, N.Y., 1926, pages 13, 14 and 15, SAMUEL KOREN, *Primary Examiner.*

ALDRICH F. MEDBERY, *Examiner.*